United States Patent [19]
Chu et al.

[11] Patent Number: 5,761,895
[45] Date of Patent: Jun. 9, 1998

[54] TRANSIENT LOAD CONTROLLER FOR GAS TURBINE POWER GENERATOR

[75] Inventors: Henry G. Chu, Scotia, N.Y.; Kenneth E. Coon, Ocean, N.J.

[73] Assignee: General Electric Company, Schenectady, N.Y.

[21] Appl. No.: 519,959

[22] Filed: Aug. 28, 1995

[51] Int. Cl.$^6$ .................................................. F01C 9/28
[52] U.S. Cl. ........................................ 60/39.03; 60/39.281
[58] Field of Search ............................ 60/39.03, 39.281

[56] References Cited

U.S. PATENT DOCUMENTS

| 4,993,221 | 2/1991 | Idelchik | 60/39.03 |
| 5,252,860 | 10/1993 | McCarty et al. | 60/39.03 |
| 5,301,499 | 4/1994 | Jensen et al. | 60/39.03 |
| 5,555,719 | 9/1996 | Rowen et al. | 60/39.03 |

OTHER PUBLICATIONS

Rowen, W.I. "Speedtronic Mark V Gas Turbine Control System" G.E. Publication GEK–3658D, 1994.

*Primary Examiner*—Louis J. Casaregola
*Attorney, Agent, or Firm*—Nixon & Vanderhye

[57] ABSTRACT

A transient control system for a gas turbine controller that cooperates with a droop speed governor to generate fuel commands regulating fuel flow to combustors of the gas turbine. The transient control system provides compensation for variations in the power output of a gas turbine while the turbine is in transient phase operation. A proportional plus integral controller in the transient control system establishes a power output set point at the initiation of a transfer phase and compares the set point to the current power output of the gas turbine. An output signal indicative of the current power output and its set point generated by the proportional plus integral controller is applied to the droop governor to compensate for variations in the power output of the gas turbine during the transient phase.

6 Claims, 3 Drawing Sheets

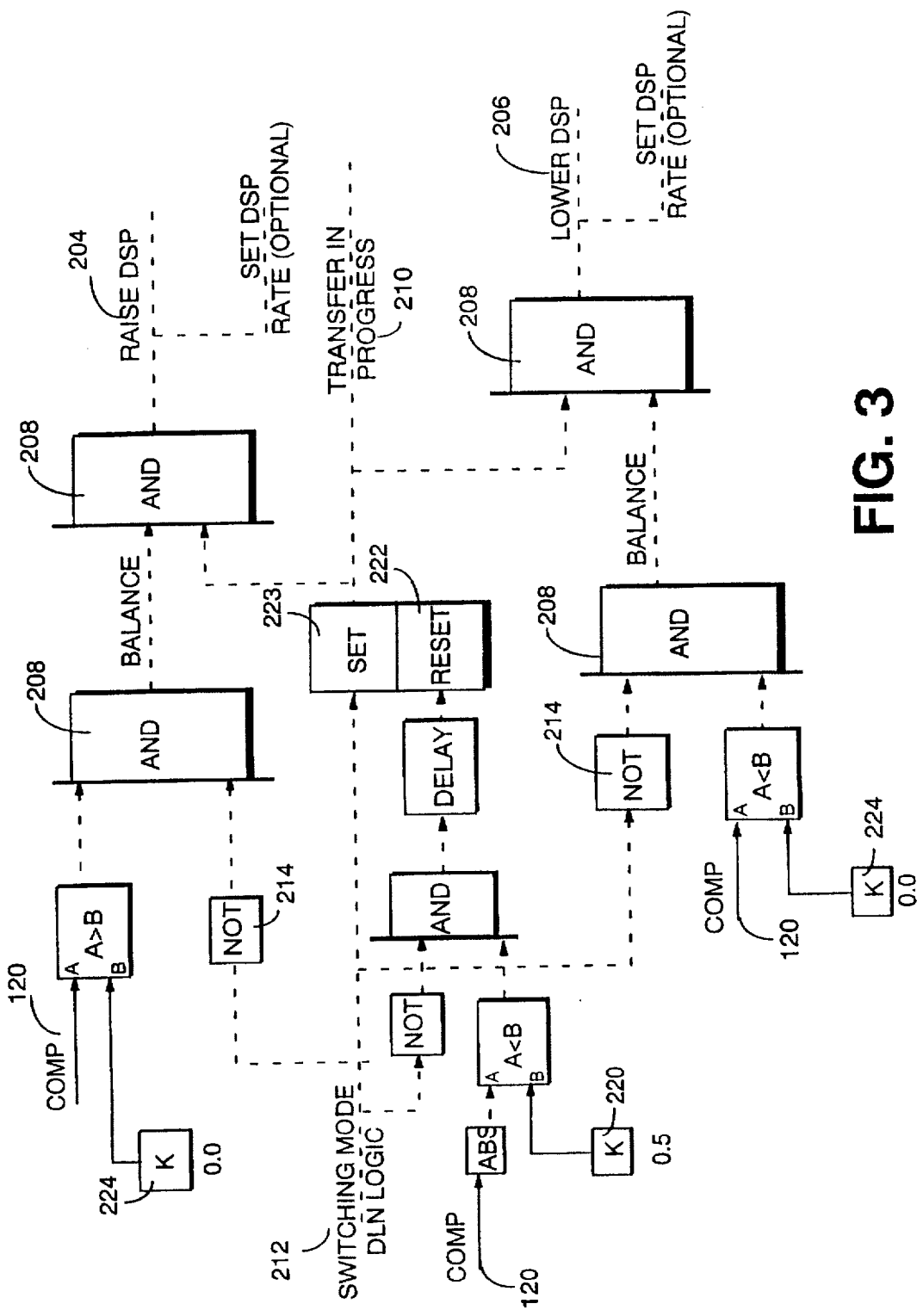

TRANSIENT LOAD CONTROLLER FOR GAS TURBINE POWER GENERATOR

FIELD OF INVENTION

This invention relates generally to the field of control systems for gas turbines and combined-cycle power generating systems.

BACKGROUND AND SUMMARY OF INVENTION

Industrial and power generation gas turbines have control systems ("controllers") that monitor and control their operation. Traditionally, these controllers have included a speed droop governor that generates fuel control signals to regulate fuel flow to the gas turbine's combustor. The power output of the gas turbine is typically maintained at a selected level by holding the fuel flow to the combustor constant.

During transient gas turbine operations, such as the combustion mode transfer of the Dry Low NOx combustion system, fluctuations in the power output of the gas turbine can occur due to variations in combustion that are characteristic of transient operations. Similarly, fluctuations in power output can occur as the fuel flow to the combustors is switched between gaseous and liquid fuels. These fluctuations in output power are an undesirable aspect of gas turbine operation and there has been no satisfactory way to minimize these fluctuations. Accordingly, there has been a long-felt need for a load controller that provides the fuel regulation of a conventional droop governor and maintains constant output power by compensating for the variations that occur during transient gas turbine operations.

The present invention is a transient load controller that maintains the power output of a gas turbine at a selected output level. This transient load controller embodiment is integrated into a conventional droop governor to a gas turbine. In one embodiment of the invention, a conventional droop governor has been adapted to receive a compensation signal from a transient load controller. The compensation signal is combined with the fuel control signal generated by the droop governor to regulate the fuel flow to a combustor of a gas turbine. This embodiment of the transient load controller is active only during certain transient operations and, when active, generates a fuel control signal indicative of the difference between the actual and a desired power output of the gas turbine. Moreover, this signal generated by the transient load controller increases or decreases in its intensity as a function (proportionally and integrally) of both the difference in the actual and desired output of the gas turbine, and the amount of time during which the difference has persisted. The compensation signal from the transient load controller is combined with the fuel control signal from the droop governor to provide a smoother and more constant power output during transient gas turbine operations.

DESCRIPTION OF THE DRAWINGS

FIG. 3 is an exemplary logic diagram showing the operation of the embodiment of the transient load controller shown in FIGS. 2A and 2B.

DETAILED DESCRIPTION OF THE DRAWINGS

Figure 1:
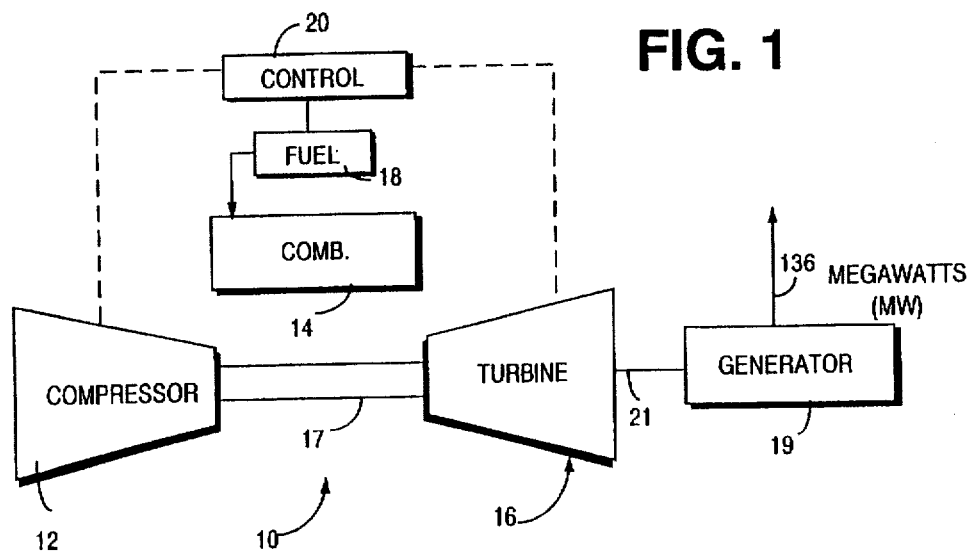
FIG. 1 is a schematic depiction of a gas turbine having a fuel control system.

FIG. 1 shows a gas turbine 10, that includes a compressor 12, combustor 14, turbine 16 drivingly connected to the compressor by a shaft 17, fuel controller 18 and a gas turbine control system 20. The gas turbine drives a generator 19 through shaft 21 to produce electrical power 136. The control system 20 monitors the operation of the gas turbine by sensors that detect, for example, the power output from the turbine, rotational speed of the compressor and turbine, turbine inlet and exhaust temperatures, fuel flow to the combustor, compressor pressure and other operating conditions.

Figure 2A:
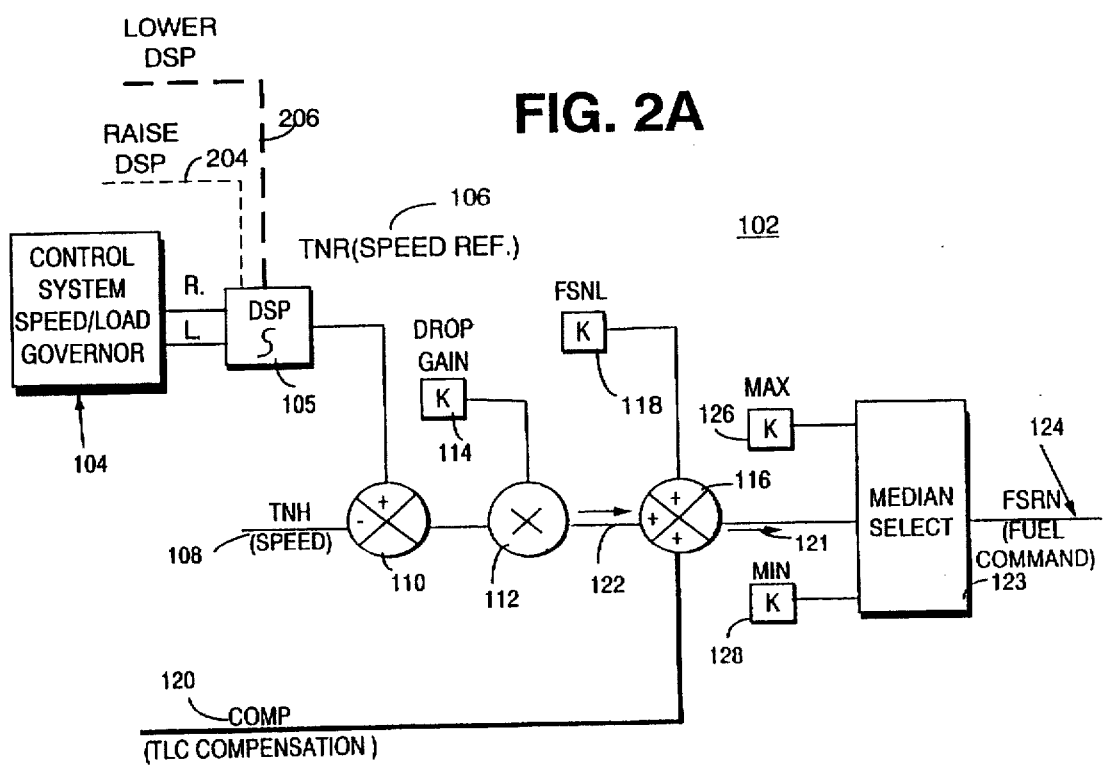
FIGS. 2A and 2B are schematic depictions of the transient load controller portion of the fuel control system shown in FIG. 1.

The control system of the preferred embodiment is a conventional General Electric SPEEDTRONIC™ Mark V Gas Turbine Control System having a droop governor, and programmed and modified to include a transient load control system or controller 100 (FIGS. 2 A & B). A conventional SPEEDTRONIC™ Mark V Gas Turbine Control System is described in Rowen, W. I., "SPEEDTRONIC™ Mark V Gas Turbine Control System", GER-3658D, published by GE Industrial & Power Systems of Schenectady, N.Y. The SPEEDTRONIC™ control system is a computer system that includes microprocessors that execute programs to control the operation of the gas turbine using sensor inputs and instructions from human operators. The control system includes logic units, such as sample and hold, summation and difference units, that may be implemented in software or by hardwire logic circuits. The commands generated by the control system processors cause actuators on the gas turbine to, for example, adjust the fuel control system that supplies fuel to the combustion chamber, set the inlet guide vanes to the compressor, and adjust other control settings on the gas turbine.

As shown in FIGS. 2 A & B, the transient load control system 100 generates a compensation signal 120 that is summed with the droop governor signal 122 to form a fuel control signal 121 that controls the fuel flow, and consequently the power output of the gas turbine. The droop governor sends commands to the fuel controller 18 that delivers fuel to the gas turbine combustor 14 at a rate proportional to a speed reference set by a human operator or according to power output settings set automatically by the controller 20. By controlling the fuel control system, the droop governor controls the power output of the gas turbine. During transient operations, the transient load control system 100 operates in conjunction with the droop governor. The compensating signal 120 generated by the transient load controller supplements the droop governor signal 122, during certain transient operations, in order to adjust the fuel flow and thereby compensates for transient operations, maintains a desired power output from the turbine, or gradually transitions the power output from one setting to another.

The droop governor 102 receives inputs from the control system speed/load governor logic 104 to raise (R) or lower (L) the speed reference signal 106 through the digital set point ramp (DSP ʃ) function 105, that is applied to increase or decrease output of the gas turbine. Similarly, the speed/load governor logic 104 allows a human operator to input raise and lower signals to adjust the speed reference for the droop governor. In response to these inputs, the droop governor 102 generates an integrated ramp signal that gradually changes the speed/load set point signal (TNR Speed Reference) 106 from the previous setting to the current setting selected by the operator or the control system.

The speed/load set point signal 106 is combined with the actual speed/load signal (TNH) 108 received from sensors monitoring the speed of the gas turbine. A comparator 110 generates a difference signal indicative of the difference between the speed set point 106 and actual speed 108 signals. The difference signal is amplified at amplifier unit 112 by a droop gain factor 114. A difference signal is generated when the speed/load set point differs from the current operating speed of the gas turbine.

The amplified speed/load difference signal (droop governor signal 122) is combined in a summation logic unit 116 with the full speed, no load set point signal (FSNL) 118. The FSNL signal is set to ensure that enough fuel flows to the combustors to operate the gas turbine at a full speed, no-load condition. The FSNL signal 118 is combined with the speed/load difference signal 122 from the droop governor to regulate the fuel flow such that the gas turbine operates under load at full speed. In addition, these two signals are combined with a transient load compensation signal 120 during certain transient gas turbine operations. The resulting combined signal 121 is received by a median select unit 123 which generates a corresponding fuel command 124 (FSRN) that is issued by the controller 20 to the fuel controller 18. The median select unit 123 prevents the fuel command from exceeding or falling below certain operational maximum 126 and minimum 128 limits. This fuel command is executed by the fuel controller to set the fuel flow to the combustor 14 of the gas turbine, which determines the power output of the gas turbine.

A principal function of the transient load controller 100 is to ensure that the output power of the gas turbine remains steady during transitional phases, and undergoes a smooth and gradual power transition as the power setting is changed. The transient load controller generates the transient load compensation signal 120 that is combined with the droop governor signal 122 and FSNL signal 118. The sum of these signals 121 is applied to adjust the fuel flow to the combustor section of the gas turbine to compensate for deviations in the output Megawatts that result during a transition in the operation of a gas turbine.

Figure 2B:
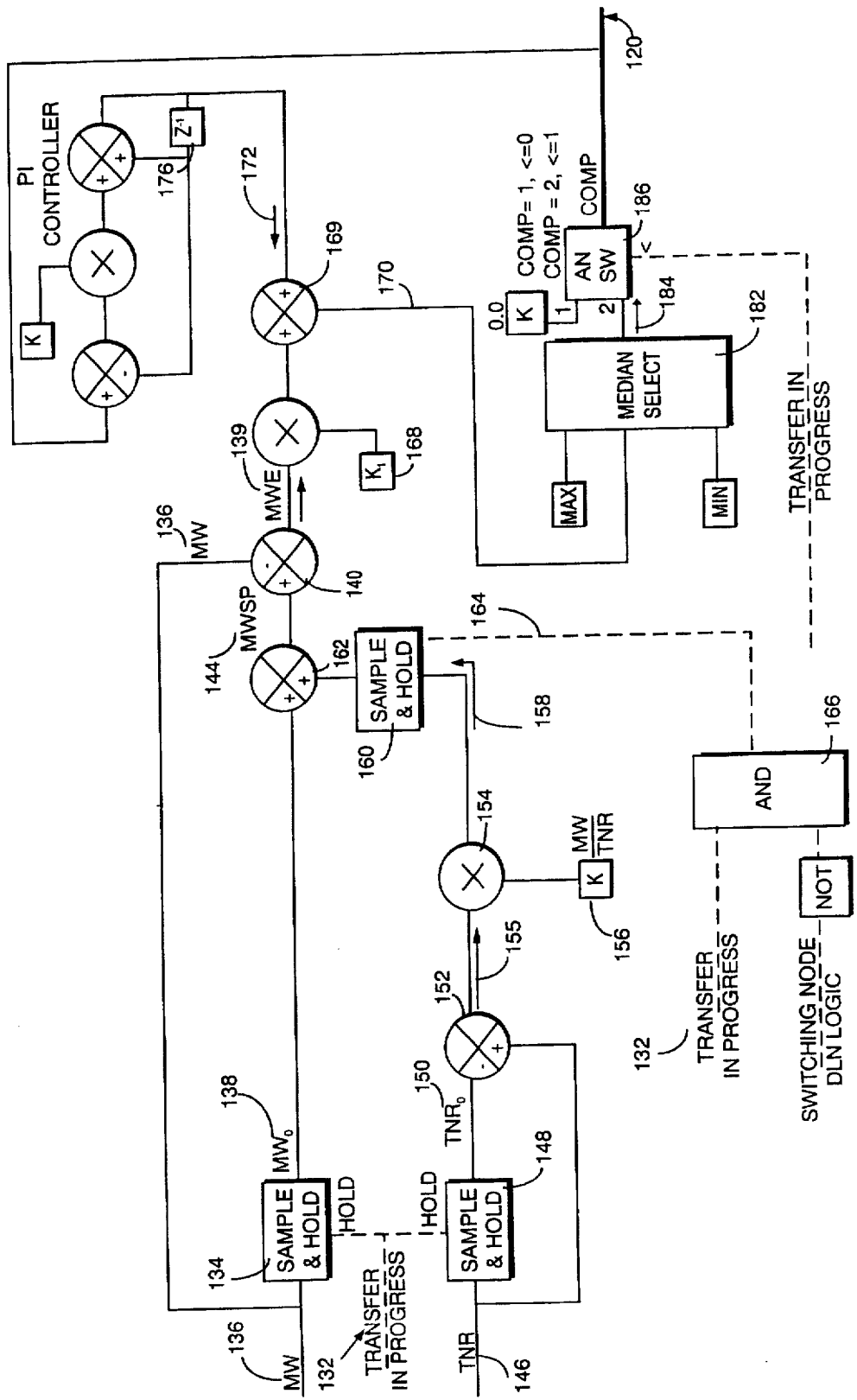

As shown in FIG. 2B, the transient load compensation signal 120 is generated by control logic of the transient load controller 100. Upon receipt of a transfer in progress signal 132 from the controller 20, a sample and hold unit 134 in the control logic captures and stores the current gas turbine output Megawatt (MW) value or signal 136. An example of a transient phase for which a transfer in process signal would be generated is a mode change for a dry low NOx (DLN) combustion system. The captured signal MWo 138 is stored and applied as the Megawatt signal set point (MWSP) 144 to establish a temporary power output set point for the power output of the gas turbine. The deviation or difference signal, i.e., Megawatt Error signal (MWE) 139, representative of the difference between the MWSP set point value 144 and the actual power output (MW) 136, is determined in comparator unit 140 and combined with an integral signal 172 from a proportional plus integral (PI) controller 142. By capturing and using as a temporary set point the power output setting MWo at the start of a transfer or transition phase, the transient load controller compensates for power variations that occur during these phases.

In a similar manner to the compensations made to smooth variations in power output, compensations are made to smooth the power output while the turbine speed reference signal (TNR) 146 is changed during a transfer or transition phase. When a transfer in progress signal 132 indicates the start of a transition phase, a sample and hold unit 148 captures and stores the then current speed reference signal and applies that signal as a temporary speed set point signal (TNRo) 150. If an operator changes the speed reference signal (TNR) during a transition phase, then a logic unit 152 determines the difference between the speed set point TNRo 150 signal and the current speed reference signal TNR, and amplifies at 154 the resulting speed difference signal 155 to convert (MW/TNR) 156 the speed difference signal 155 into a power output signal value. The converted speed-set point difference signal 158 is stored in a sample and hold unit 160, and is summed at 162 with the captured power output setting MWo 138 to yield the MWSP set point value 144.

Upon completion of a DLN mode, i.e., a mode transfer for a Dry Low NOx combustion system, the transient load controller automatically reduces to zero the compensation made for the speed reference signal and then transfers control back to the normal droop governor operation, i.e., without the transient load compensation signal 120. In this regard, the sample and hold logic unit 160 that stores the speed-set point difference signal 158 is set to hold the current speed/load value, while the compensation signal is reduced to zero. A signal 164, from a logical AND unit 166 that receives the transfer in progress signal 132 and the inverse of a DLN mode signal, defines the period during which the transient load compensation signal is reduced to zero.

The Megawatt Error signal (MWE) 139 is amplified by an adjustable gain (factor $K_1$) 168 and summed at 169 with the integral signal 172 to form the proportional plus integral (PI) signal 170. The PI controller 142 generates the integrating (integral) component 172 of the PI signal. The PI controller receives the current transient load compensation signal 120 and first generates a difference signal at comparator 174 between the current compensation signal and a delayed, i.e., prior compensation signal (Z minus 1 $\{Z^{-1}\}$) stored in a memory unit 176. This difference signal is multiplied by an integral gain 178, and the result is added to the delayed compensation signal to yield the integral component 172 of the PI signal 170.

The PI signal 170 is evaluated by a median select logic unit 182 to ensure that it is within a prescribed range. The output 184 of the median select is gated through a switch 186, such as an analog switch, that applies the output from the median select unit as the transient logic compensation signal 120 when a transfer in progress signal exists and applies a zero value as the compensation signal 120 when there is no transfer in progress signal.

FIG. 3 is a logic diagram showing an illustrative example of the operation of the transient load controller. The transient load controller generates a compensation signal (Comp.) 120 indicative of a variation between the Megawatt set point and power output and, at times, changes in the speed set point. The compensation signal 120 is reset to a zero value after completion of a DLN switching mode. In this regard, logical AND units 208 set the balance logic, i.e., the transient load control system 100, to raise (RAISE DSP, 204) or lower (LOWER DSP, 206) the digital set point ramp (DSPS) function 105 (see FIG. 2A) when the Comp. signal 220 is greater than zero value as specified by unit 224, but there is no (NOT 214) DLN switching mode signal 212. The transfer in progress logic signal 210 is calculated based on the logic that indicates a DLN fuel transfer in progress (DLN switching mode signal 212). The logic signal 210 holds its state (SET 223) until it is released (RESET 222) when the absolute value of the Comp. signal 120 is reduced to near zero value as specified by unit 220. At that point, the Comp signal 120 is set to zero by switch 186 (see FIG. 2B) and the fuel control system is controlled solely by the droop governor and FSNL factor.

The invention has been described in connection with its preferred embodiment. Persons of ordinary skill in the art of gas turbine controls will understand that the invention is not limited to the described embodiment and may be implemented in different embodiments. In addition, the invention has been described in connection with transient conditions that relate to fuel transfers. The invention is not limited to such fuel transfer transient conditions, but rather is applicable to regulate other transient conditions and other causes of power output fluctuations. The full scope of the invention is set forth in the following claims and equivalents thereto.

What is claimed is:

1. A method for regulating the fuel flow to a combustor of a gas turbine having a computer control system with a droop governor and transient load controller, wherein the method comprises the following steps:

a. capturing with the transient load controller a current power output value of the gas turbine at the beginning of a transition phase of the gas turbine;

b. applying the current power output value to generate a temporary power output set point in the transient load controller;

c. calculating in the transient load controller a difference signal indicative of the difference between the current power output value of the gas turbine and the temporary power output set point;

d. generating a compensation signal in the transient load controller indicative of the difference signal calculated in step (c), and e. applying the compensation signal in combination with a signal generated by the droop governor to adjust the fuel flow to the combustor.

2. A method as in claim 1 further comprising the following steps:

f. reducing the absolute value of the compensation signal generated in step (e) to substantially zero.

3. A method as in claim 1 further comprising the following steps:

g. capturing with the transient load controller a current turbine speed reference signal for the gas turbine transition phase;

h. establishing the current turbine speed reference signal as a temporary speed set point signal during the transition phase;

i. calculating in the transient load controller a speed difference signal indicative of the difference between the current turbine speed reference signal of the gas turbine and the temporary speed set point signal; and j. summing the speed difference signal with the current power output value to generate the temporary power output set point established in step (b).

4. A method as in claim 3 further comprising the following steps:

k. prior to step (j) converting the value of the speed difference signal from a speed value to a commensurate power output value.

5. A method as in claim 3 wherein step (j) is performed only after a pre-determined combustor mode transition is initiated and while a transfer in progress signal is applied to the transient load controller.

6. A method as in claim 5 wherein the combustor mode transition in step (j) is a combustion mode transfer of a dry low NOx combustor.

* * * * *